INVENTOR
R. A. KAENEL
BY Herbert M. Shapiro
ATTORNEY

April 1, 1969 R. A. KAENEL 3,436,748

MAGNETIC DOMAIN WALL RECOGNIZER

Filed Aug. 30, 1965 Sheet 4 of 4

3,436,748
MAGNETIC DOMAIN WALL RECOGNIZER
Reginald A. Kaenel, Chatham, N.J., assignor to Bell Telephone Laboratories, Incorporated, New York, N.Y., a corporation of New York
Filed Aug. 30, 1965, Ser. No. 483,435
Int. Cl. G11b 5/06; G06k 7/08; G06f 7/02
U.S. Cl. 340—174 8 Claims

ABSTRACT OF THE DISCLOSURE

A magnetic domain wall recognizer is described wherein first and second walls of a reverse-magnetized domain are moved toward one another in a magnetic medium in response to propagation fields representative of stored and incoming information respectively. If the stored and incoming information match, domain collapse is achieved at a central position in the magnetic medium in which the domain is formed for detection by an output coupling there.

This invention relates to information processing devices and, more particularly, to devices for recognizing characteristic information.

Devices for recognizing characteristic information, often termed "word recognizers," are in widespread use in all types of communication and data processing systems. For example, in communication systems where a plurality of receivers are potentially capable of receiving a communication, each receiver includes, advantageously, a word recognizer for detecting a characteristic word designating the receiver to which the communication is addressed. In the absence of the characteristic word (address) designating a receiver, that receiver is disabled from receiving the communication. This transmission medium is competitive with switching (tree) logic systems, primarily, to the extent that inexpensive word recognizers become available. Moreover, tree logic systems are impractical in certain instances such as in remote radio telephone receiver systems.

An object of this invention is to provide a new and novel, relatively inexpensive word recognizer.

The foregoing and further objects of this invention are realized in one embodiment thereof wherein a magnetic wire domain wall device is turned to account. A stable reverse (magnetized) domain, bounded by leading and trailing domain walls, is nucleated over a relatively long length of the wire. The domain walls then are controllably propagated along the wire towards a common point therebetween to which point a sense conductor is coupled. One of the domain walls is propagated in response to a step-along propagation field. The other domain wall is propagated by coded fields which, in response to coded inputs, propagate the wall successively along the wire between spaced apart constant propagating fields. Only if the coded inputs provide coded fields to advance the last-mentioned domain wall between the sequence of spaced apart propagation fields do the two walls extinguish one another at the sense coupling to provide a large output therein. Otherwise, only one wall passes the sense coupling to provide a relatively low level output.

Accordingly, a feature of this invention is a domain wall word recognizer wherein a reverse domain is controllably collapsed at a sense coupling in response to coded input pulses.

The foregoing and further objects and features of this invention will be understood more fully from a consideration of the following detailed description rendered in conjunction with the accompanying drawing, in which:

FIG. 1 is a schematic illustration of a word recognizer in accordance with this invention;

FIGS. 2 through 10, and 12 through 18 are schematic illustrations of a portion of the circuit of FIG. 1 showing the magnetic field and flux configurations therein during operation;

Figure 1:
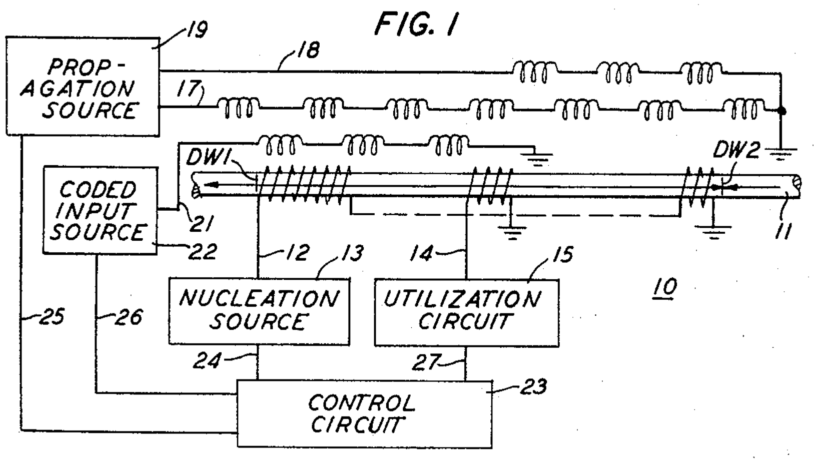

FIG. 1 shows a word recognizer 10 in accordance with this invention. The word recognizer comprises a magnetic wire 11 to which a nucleation conductor 12 is coupled along a major portion of its length. Nucleation conductor 12 is connected between a nucleation source 13 and ground. A sense conductor 14, connected between a utilization circuit 15 and ground is coupled to wire 11 at a position therein essentially at the midpoint of that portion of wire 11 coupled by nucleation conductor 12. A first propagation conductor 17 is coupled to wire 11 at spaced apart positions therealong, one coupling (coil) thereof coupling that same portion of wire 11 coupled by sense conductor 14. A second propagation conductor 18 is coupled, to wire 11 at spaced apart positions defined by the spacings between those positions coupled by conductor 17 to a first side of sense conductor 14 thus providing interleaved propagation conductors. Propagation conductors 17 and 18 are connected between a propagation conductor 19 and ground. Although the conductors are coupled to wire 11, they are shown spaced apart therefrom for the sake of clarity. A coded conductor 21 is coupled to those positions along wire 11 defined by the spacings between those positions coupled by conductor 17 to a second side of sense conductor 14. Coded conductor 21 is connected between a coded input source 22 and ground and, although coupled to wire 11, is shown spaced apart therefrom for clarity. The various couplings of the conductors to wire 11 may be made in any known manner. Direct wrapping has been found quite suitable. The sources 13, 19, and 22, and utilization circuit 15 are connected to a control circuit 23 by means of conductors 24, 25, 26, and 27, respectively. The various sources and circuits may be any such elements capable of operating in accordance with this invention.

Figure 2:
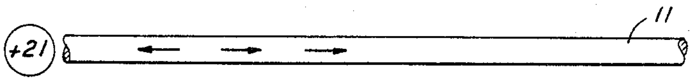
Figure 3:
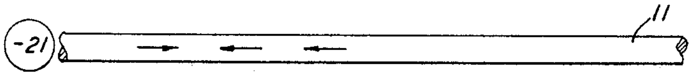

For an illustrative operation of the circuit of FIG. 1, it is assumed that the word 100 is to be recognized. To this end, the coded conductor 21 has a corresponding coded arrangement of coils coupling wire 11, specifically, the polarity of the coils of conductor 21 coupling wire 11 from left to right as viewed in FIG. 1 is +, —, and —. A positive pulse applied to conductor 21, then, provides a pattern of fields in the coupled portions of wire 11 represented by the arrows in FIG. 2 directed, from left to right, to the left, to the right, and to the right. A positive pulse applied to conductor 21 for generating such a field pattern is indicated by an encircled +21 to the left of the representation of wire 11 in FIG. 2. The field pattern generated by a negative pulse applied to conductor 21 is represented in FIG. 3 by arrows directed to the right, to the left, and to the left, as viewed in the figure. The negative pulse applied to conductor 21 is represented by the encircled —21 shown to the left of the representation of wire 11 in FIG. 3. Operation of the circuit of FIG. 1 entails the controlled provision of the field patterns shown in FIGS. 2 and 3 in response to positive and negative input pulses representing binary ones and zeros, respectively, in a binary word to be recognized.

Operation is initiated, conveniently, in response to a timing pulse which normally precedes input information on conductor 21 under the control of a usually remote transmission source included, illustratively, in control circuit 23. In response to the timing pulse, nucleation source 13, under the control of control circuit 23, pulses conductor 12 nucleating a (stable) reverse domain over a substantial length of wire 11. The reverse domain is represented in FIG. 1 by an arrow directed to the right in the portion of wire 11 coupled by conductor 12. A forward (magnetized) domain to which wire 11 is assumed initialized is represented by arrows directed to the left in wire 11. A reverse domain is separated from adjacent forward domains by first and second domain walls as is well known. At a later time, under the control of control circuit 23, propagation source 19 applies pulses alternatively to propagation conductors 17 and 18 for moving the first and second domain walls, designated DW1 and DW2, respectively, in FIG. 1 towards that portion of wire 11 coupled by sense conductor 14. That is to say, the reverse domain therebetween is controllably collapsed. To this end, the polarities of succeeding couplings of each of conductors 17 and 18 are alike for providing pulsed like fields for advancing the domain walls in the desired direction digitally. A pulse, in addition, is applied to conductor 21 each time a pulse is applied to conductor 18 under the control of control circuit 23. For this purpose, control circuit 23 may include means for adjusting the propagation rate to the rate at which input pulses are applied.

The advance of the domain wall DW1 towards the sense conductor 14 depends upon the propagation pulses applied to conductor 17 and upon the coded pulses applied to conductor 21. The advance of the domain wall DW2 towards sense conductor 14, on the other hand, depends on the propagation pulses applied to conductors 17 and 18. Only if the coded pulses are coded, illustratively, in a succession of positive and negative polarities which match the succession of positive and negative coupling polarities of conductor 21 to wire 11 will the domain walls reach sense conductor 14 simultaneously to extinguish one another there providing a large output pulse indicative of a proper input code.

Figure 4:
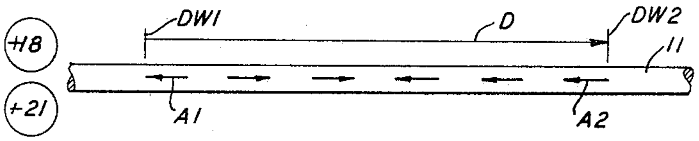
Figure 5:
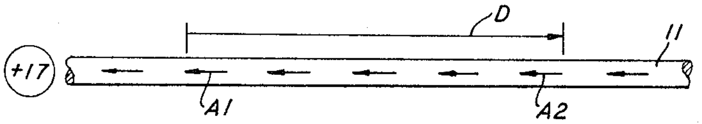
Figure 6:
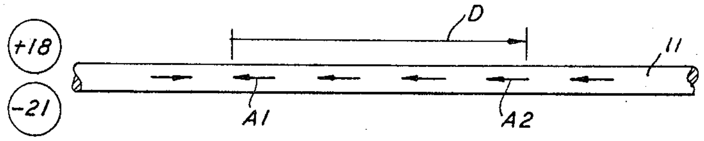
Figure 7:
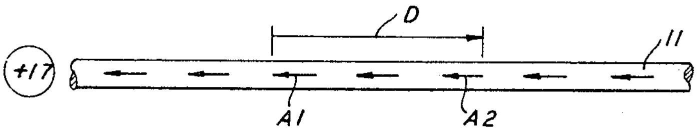
Figure 8:
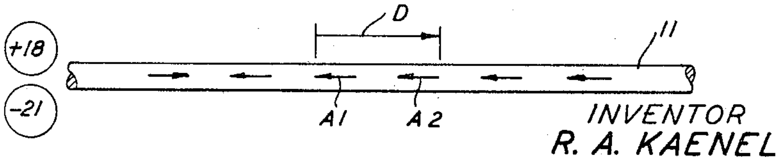
Figure 9:
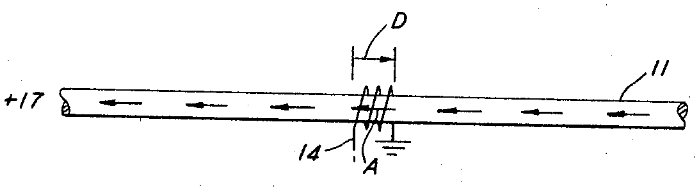

FIGS. 4 through 10 depict magnetic wire 11 with field configurations shown therein for various stages of operation. FIGS. 5, 7, and 9 show the field configuration for a positive pulse applied to propagation conductor 17. Specifically, the field configuration is represented in FIGS. 5, 7, and 9 by spaced apart arrows all directed to the left. The polarity of the pulse and the conductor to which applied for achieving the field pattern shown are indicated by the encircled +17 to the left of the representation of wire 11 in each of those figures. The spaced apart positions of the fields, it is to be understood, coincide with the positions of the couplings of conductor 17 on wire 11.

FIGS. 4, 6 and 8 show the field configuration for a coded pulse applied to conductor 21 concurrently with a pulse applied to propagation conductor 18. For the assumed illustrative operation, the proper sequence of coded pulses is positive, negative, and negative (100). First a positive pulse is applied as indicated by the encircled +21 to the left of the representation of wire 11 in FIG. 4. The field pattern due to such a coded pulse, shown previously in FIG. 2, is now depicted in corresponding spaced apart positions of wire 11 in FIG. 4 by the three arrows to the left, as viewed in the figure, directed to the left, to the right, and to the right, going from left to right as viewed. The pulse applied concurrently to conductor 18, represented by the encircled +18 in the figure, provides a field configuration as represented by the three arrows to the right in FIG. 4, all directed to the left as viewed. The field configuration due to the propagation pulse on conductor 18 is repeated in FIGS. 6 and 8 for corresponding positions of wire 11. The configuration for the coded pulse, however, changes. Specifically, the second and third coded pulses are negative and thus the field configuration shown in FIG. 3 is shown as the configuration in each of FIGS. 6 and 8 for corresponding positions of wire 11. The polarity of the coded pulse and the conductor to which applied are indicated by the encircled —21 to the left of the representation of wire 11 in each of those figures.

The advance of the domain wall DW1 in the presence of these superimposed coded fields is now discussed briefly to show that the wall is in fact propagated synchronously with the propagation of domain wall DW2 for reaching sense conductor 14 simultaneously in response to a properly coded sequence of pulses. Then it will be shown that for a coded pulse of inappropriate polarity, that is for a mismatch betwen the polarity of the coded pulse and the polarity of the corresponding coupling of conductor 21 on wire 11, the propagation of domain wall DW1 is delayed such that domain wall DW2 alone arrives at sense conductor 14.

To simplify the description, the position of reverse domain D bounded by domain wall DW1 on the left and domain wall DW2 on the right as viewed is shown just above the representation of wire 11 in each of FIGS. 4 through 9. The positions of the domain walls are different in each figure in response to the changes in the field configuration in wire 11. The arrows representing the portion of the field configuration effecting the change in position of domain walls DW1 and DW2 are designated A1 and A2, respectively, in each figure. The position to which those walls are driven by the field represented by those arrows in each figure is shown in the next succeeding figure.

Figure 10:
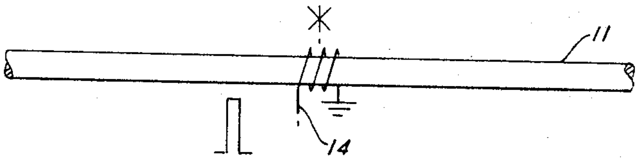

FIG. 4, accordingly, depicts reverse domain D in an assumed initial position. The arrows A1 and A2 are effective to reverse the magnetization of those portions of domain D to a forward direction reducing the size of domain D to that shown in FIG. 5. It is noted that the arrow A1 represents part of a field configuration in response to a properly coded input pulse on conductor 21. The fields effective to next move domain walls DW1 and DW2 are shown in FIG. 5 as arrows, again designated A1 and A2, respectively. Both of these arrows are directed to the left as shown. The field pattern is generated in response to a positive pulse applied to propagation conductor 17 as indicated by the encircled +17 and results in a reversal to a forward direction of the flux in the portions of wire 11 corresponding to the arrows. The domain D consequently is shortened as shown in FIG. 6. Similarly, the domain walls are stepped closer together synchronously in response to the pulse pattern +18, —21; +17; and +18, —21, as shown in FIGS. 6, 7, and 8, respectively. In response to a next positive pulse applied to conductor 17, as indicated by the encircled +17 in FIG. 9, a field is generated through the reverse domain in a direction to move domain walls towards one another. This is shown by the arrow, designated A, in FIG. 9. As a result, all the flux in the reverse domain is switched to a forward direction in a first time required for the domain walls to traverse half the length of the domain D shown in FIG. 9 after which time the domain is annihilated. The switching flux induces an output in sense conductor 14 as shown by the pulse designation in FIG. 10. The annihilated domain is represented in FIG. 10 by a broken vertical line with an X through it. Thus it has been shown that a proper input code provides an output pulse having a characteristic amplitude and duration which are functions of the flux in the reverse domain as shown in FIG. 9 and the time for the domain to be annihilated.

Figure 11:
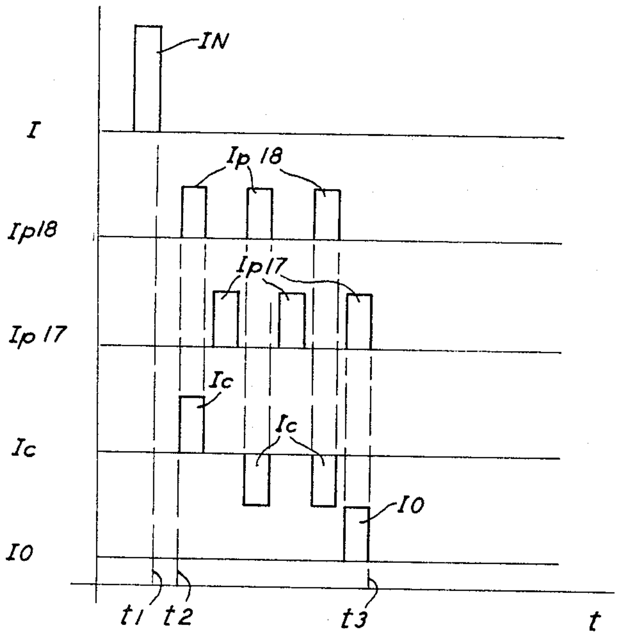
FIG. 11 is a diagram of the pulses applied during operation of the word recognizer of FIG. 1.

The various pulses applied during operation, in accordance with the assumed illustrative operation, are summarized in the pulse diagram of FIG. 11, the timing pulse being omitted. Specifically, a nucleation pulse, designated IN terminating at a time designated *t1* is followed by a sequence of positive pulses designated IP18 and IP17 applied alternately to propagation conductors 18 and 17. The last-mentioned pulses are initiated at a time *t2* and terminated at a time *t3*. Coded pulses designated IC, illustratively positive, negative, and negative, are synchronized with the pulses IP18. An output pulse, designated IO, appears in response to the last pulse, IP17, also terminating at about time *t3*.

Figure 12:
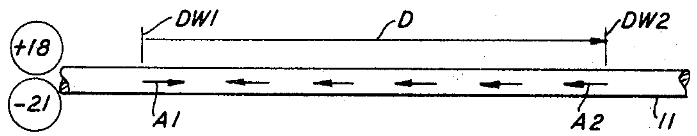
Figure 13:
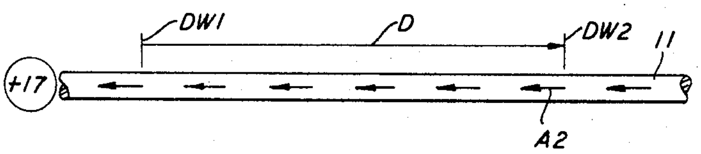

FIGS. 12 through 18 depict the progress of a reverse domain when an inappropriately coded word is received, for example, the word 000 represented by three negative coded pulses. At the outset, it is helpful to compare FIG. 12 with FIG. 4. It is to be recognized that the domain D and the domain walls DW1 and DW2 are positioned alike in the two figures. It is also to be recognized that the three arrows to the right as viewed in each of those figures are directed to the left in response to a positive pulse applied to conductor 18 as indicated by the encircled +18 in each of those figures. Most importantly, however, a negative coded pulse is applied to conductor 21 as indicated by the encircled −21 in FIG. 12. In response to this pulse, the field configuration shown in FIG. 3 is generated in corresponding positions of wire 11 as shown in FIG. 12. The arrow A1, which represents the portion of the field affecting domain wall DW1 is in a direction to maintain fixed the position of that wall. The direction of that arrow is seen to be opposite to that of the arrow A1 in FIG. 4. Consequently, domain wall DW1 is not moved; domain wall DW2, however, moves to the left in response to the field represented by the arrow A2 exactly as described in connection with FIG. 4. The resulting positions are shown in FIG. 13.

A positive field next applied to conductor 17 as indicated by the encircled +17 in FIG. 13 includes no field portion which affects domain wall DW1. Domain wall DW2, however, is affected by the field portion represented by arrow A2. Consequently, domain wall DW1 remains unmoved while domain wall DW2 moves to the left as viewed in the figure.

Figure 14:
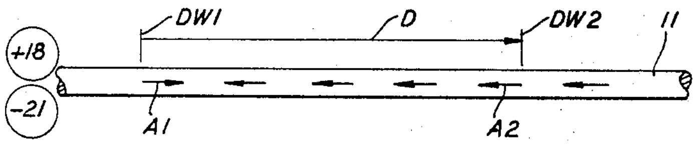
Figure 15:
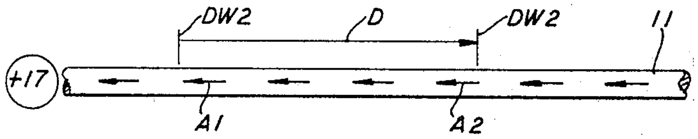
Figure 16:
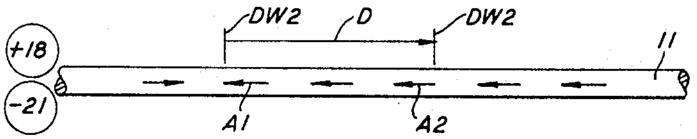
Figure 17:
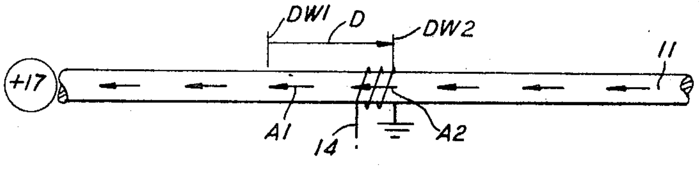
Figure 18:
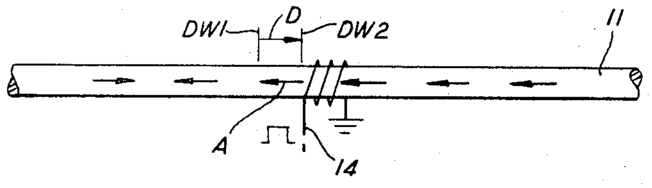

FIGS. 14 through 16 depict the controlled collapse of the domain D exactly as described hereinbefore in response to the pulse sequence +18, −21; +17; and +18, −21, as indicated by the encircled designations in each figure. In this instance, however, domain wall DW2 arrives at sense conductor 14 before domain wall DW1 because of the previous failure of the latter to move. This is illustrated by the position of the domain wall DW2 with respect to sense conductor 14 in FIG 17. In response to the next positive pulse applied to conductor 17, as indicated by the encircled +17 in FIG. 17, domain D further collapses at a position to the left of the sense conductor, domain wall DW2 moving "through" the sense coupling. The flux in the portion of wire 11 through which domain wall DW2 "sweeps" in response to that pulse couples the sense conductor inducing a pulse therein of a duration determined by the time for the wall to traverse the entire coupling. This time is double that required for each of two walls to traverse half the coupling as described hereinbefore. Also, since the flux is the same for a two-wall "sweep" or a one-wall "sweep," the amplitude of the pulse in the latter case is half that of the pulse in the former. Detection may be implemented simply by a biased transistor amplifier responsive, for example, to a pulse of the larger amplitude only. A reset operation (that is, a nucleation pulse on conductor 12) may occur at this juncture, a later collapse of domain D being unnecessary as is clear from FIG. 18 because, illustratively, the sense conductor is not positioned to detect such a collapse.

It may be appreciated that the description of a mismatched first bit of a word to be recognized is applicable regardless of later bits. Thus, the description is identical for the disposition of the reverse domain for each of the incorrect words 00, 010, 001, and 011. For mismatched second and third bits, the disposition of the reverse domain is entirely analogous.

The invention so far has been described in terms of bipolar input pulses. Frequently, binary words originate in the form of unipolar pulses indicating binary ones and zeros, for example, by the presence and absence of a pulse. In such cases strobing pulses are provided by the sending equipment. Devices in accordance with this invention are admirably adapted to the recognition of unipolar pulses taking advantage of externally supplied strobing pulses in a manner to provide a quite economical package.

Figure 19:
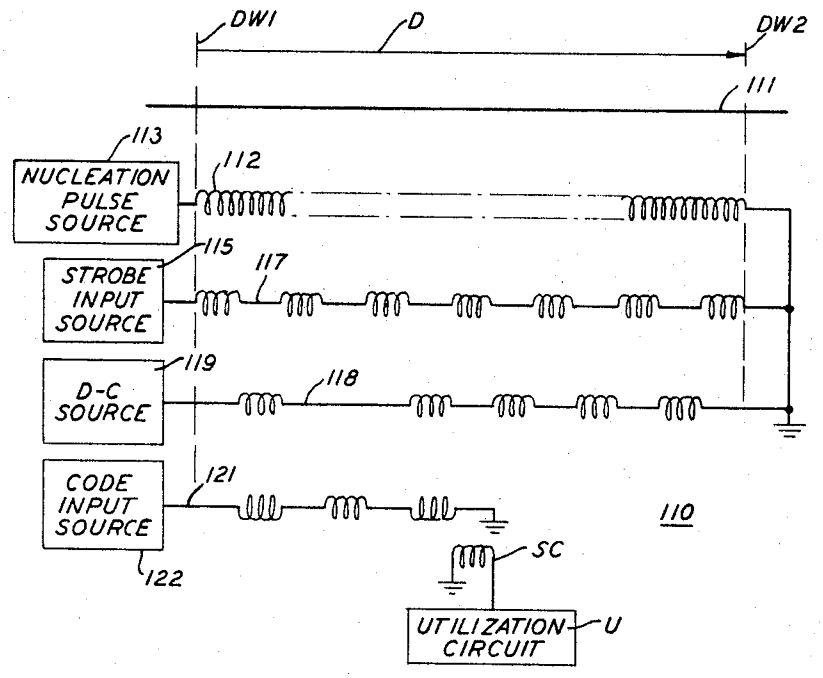
FIG. 19 is a schematic illustration of another word recognizer in accordance with this invention.

Such an arrangement is shown schematically in FIG. 19. Specifically, FIG. 19 shows a word recognizer 110 comprising a magnetic wire of the type described, represented by a horizontal line 111. A nucleation conductor 112, coupling magnetic wire 111 along most of its length, is connected between a nucleation pulse source 113 and ground. A second propagation conductor 118 is coupled wire 111 at spaced apart positions therealong. Conductor 117 is connected between a strobe input source 115 and ground. A second propagation conductor 119 is coupled to wire 111 at spaced apart positions therealong defined between those spaced apart positions coupled by conductor 117. Importantly, one of the spaced apart positions along wire 111 is left uncoupled by conductor 118 for each occurrence of one predesignated binary value in a properly coded word. For example, for a coded word 010, the second coupling from the left as viewed in FIG. 19 is omitted corresponding to the binary one in the second position of the code. For longer words including additional binary ones, a corresponding portion of wire 111 is left uncoupled for each occurrence of a binary one. Conductor 118 is connected between a D.C. source 119 and ground. All the couplings of conductors 117 and 118 are in the same (first) sense. It is noted that conductor 117, illustratively, has an odd number of couplings therealong, seven in all as shown. A sense conductor SC is coupled to wire 111 at the same position as the center coupling of conductor 117. Sense conductor SC is connected between a utilization circuit U and ground. A coded conductor 121 is coupled to wire 111 at spaced apart positions therealong to the left of sense conductor SC as viewed in FIG. 19. In the embodiment of FIG. 19, however, the couplings of conductor 121 are arranged such that the couplings correspond in position to the couplings (even "omitted" ones) of conductor 118. In addition, the couplings of conductor 121 are of the same (first) sense as the couplings of conductor 118 at positions where the couplings of the latter are omitted and of opposite (second) sense where those couplings are present. Thus, for a 010 code, the first and third couplings of the coded conductor 121 are poled opposite to the corresponding couplings of conductor 118. The second coupling of conductor 121 is poled as are the couplings of conductor 118. Coded conductor 121 is connected between a code input source 122 and ground.

The operation of the circuit of FIG. 19 is entirely analogous to the operation of the circuit of FIG. 1. The mechanism, however, is different. Here, in response to a properly coded input pulse, there is generated about the coded conductor 121 that portion of the propagation field left unsupplied by the omitted coupling of conductor 118. An improperly coded pulse, that is, the absence of a pulse (a zero), accordingly, acts to "inhibit" propagation. This is clear from a consideration of the field diagram of FIG. 20 which illustrates the foregoing field configurations.

Figure 20:
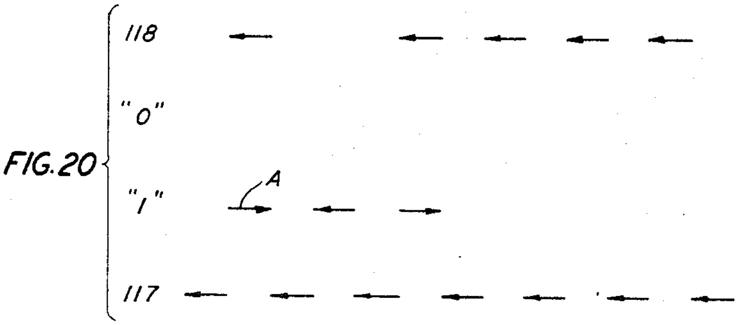
FIG. 20 is a chart of magnetic fields in a portion of the word recognizer of FIG. 19 during operation.

Thus, a domain D is established in response to a nucleation pulse in conductor 112 initiated in response to a timing pulse as described hereinbefore. The domain wall DW2 is controllably stepped to the left, as viewed, exactly as described hereinbefore. Meanwhile, coded input source 122 supplies a sequence of pulses, space, pulse, space for the illustrative word 010, "simultaneous" with the strobe pulses applied to conductor 117. As is usually the case, the strobe pulse herein is a marker pulse after which either a D.C. level is established for binary ones or, alternatively, a zero D.C. level is established for binary zeros. The strobe pulse thus initiates the controlled collapse of the domain functioning further as do pulses supplied to the propagation conductor 17 of FIG. 1. The D.C. level maintained in propagation conductor 118 and the D.C. levels in coded conductor 121 function, as do pulses in the propagation conductor 18 of the circuit of FIG. 1, to move together domain walls brought within the influences of the fields thereof by the fields generated by the strobe pulses. Thus, for the assumed illustrative operation 010, the absence of a coded input pulse, that is, the binary zero D.C. level, permits the D.C. level in conductor 118 to advance domain wall DW1 toward sense conductor SC. The appearance of a next coded pulse (binary one) provides a binary one level itself to advance the domain wall where wire 111 is uncoupled by conductor 118, and the final absence of a coded pulse again permits the D.C. level in conductor 118 to advance the wall to the sense conductor synchronous with the advance of domain wall DW2 for annihilation of domain D there as described hereinbefore. Were a pulse to appear where the absence of a pulse is required, for example, a pulse in the first "coded" position, the field represented by arrow A in FIG. 20 is generated to inhibit the field at the corresponding coupling of conductor 118 thus inhibiting propagation. If, on the other hand, a pulse were absent in the second coded position, the domain wall, then at a position left uncoupled by conductor 118, is not advanced. In this manner, the walls are not advanced synchronously for annihilating domain D at the sense conductor as described. The various sources and circuits may be any such elements capable of operating in accordance with this invention. The economy of such an arrangement is clear from a realization that only D.C. levels need be supplied by sources 119 and 113 and that the strobe and input pulses are supplied by the transmitting equipment.

A word recognizer, in accordance with this invention, lends itself to many adaptations. For example, the coded conductor 21 of FIG. 1, although wired in a particular code is amenable to alteration of that code by placing the coils of conductor 21 about wire 11 individually with a pair of leads protruding from each coil. Such an arrangement may be mated with plug-in boards which implement the interconnection of the coils in coded fashion. Moreover, individual word recognizers, conveniently in ten bit lengths, may be plugged into one another providing word recognizers of, for example, multiples-of-ten lengths. It may be appreciated also that a continuation of the illustrative (magnetic wire) structure beyond, for example, ten bit lengths allowing for multiple sense conductors coupled to the positions of the magnetic wire corresponding to, for example, each tenth bit, also permits recognition of multiple codes. Consequently, a word recognizer in accordance with this invention is quite versatile. In addition, it has been found that multiple turns for the propagation couplings permit the driving thereof with, for example, 100 milliampere power supply. This requirement is compatible with inexpensive monolithic semiconductor circuitry.

The initial position of the reverse domain shown, for example, in FIG. 1 is selected arbitrarily. The position shown in FIG. 1 was chosen such that the first of a coded sequence of pulses may be used to trigger the recognition operation rather than requiring a preceding timing pulse.

It is to be understood that the invention is described in terms of a magnetic wire, domains of specific (relative) length, particular magnetization directions, and a particular propagation mode. Alternatives to each of these are well known and adaptable in various combinations in accordance with this invention. For example, thin film domain wall shift registers may be used instead of wire registers. Also, materials with magnetization directions (easy axes) normal to the direction of propagation are adaptable. All these permutations, of which this few are illustrative, are contemplated within the scope of this invention.

Accordingly, what has been described is considered to be only illustrative of the principles of this invention and various and numerous other arrangements may be devised by one skilled in the art without departing from the spirit and scope of this invention.

What is claimed is:

1. A domain wall device including a magnetic medium, means for defining in said medium a plurality of different positions for a reverse domain including a first and a second domain wall, means for establishing in said medium a reverse domain simultaneously occupying said plurality of positions, and means responsive to coded pulse sequences for controllably collapsing said reverse domain at different positions therein, said last-mentioned means including means for moving said first domain wall toward said second through a first number of consecutive ones of said different positions and means for moving said second wall toward said first through a like number of consecutive ones of said different positions only in response to a properly coded pulse sequence.

2. A device in accordance with claim 1 including means coupled to a first of said different positions for detecting the collapse of said reverse domain there.

3. A device in accordance with claim 2 wherein said magnetic medium comprises a magnetic wire.

4. A domain wall device in accordance with claim 3 including means for providing a coded pulse sequence comprising the presence and absence of pulses of a first polarity.

5. A domain wall device in accordance with claim 3 including means for providing a coded pulse sequence comprising pulses of first and second polarities.

6. A domain wall device in accordance with claim 4 wherein said first means comprises a first conductor coupled to said magnetic wire at spaced apart positions therealong and a second conductor coupled to said magnetic wire at spaced apart positions between those to which said first conductor is coupled, said second conductor having omitted therein couplings at predesignated positions to a first side of that first position coupled by said sense means, said predesignated positions corresponding to the presence of pulses of said first polarity in said coded pulse sequence.

7. A domain wall device in accordance with claim 6 wherein said means for providing a coded pulse sequence comprises a third conductor coupled to spaced apart positions between those to which said first conductor is coupled to said first side of said first position coupled by said sense means, said first and second conductors having couplings of a first polarity, said third conductor having couplings of a first polarity at those positions uncoupled by said second conductor and couplings of a second polarity at the remaining positions to which it is coupled.

8. A domain wall device in accordance with claim 5 wherein said first means comprises a first conductor coupled to said magnetic wire at spaced apart positions therealong and a second conductor coupled to said magnetic wire at spaced apart positions between those to which said first conductor is coupled to a first side of said first position coupled by said sense means, and a third conductor coupled to said magnetic wire at spaced apart positions between those to which said first conductor is coupled to a second side of said first position, said first and second conductors having couplings of a first polarity, said third conductor having couplings of first and second polarities corresponding to the polarities of the pulses of said coded pulse sequence.

References Cited

UNITED STATES PATENTS

| | | | |
|---|---|---|---|
| 3,102,255 | 8/1963 | Curry et al. | 235—177 XR |
| 3,127,578 | 3/1964 | Long | 340—174 XR |
| 3,137,845 | 6/1964 | Snyder | 340—174 |

BERNARD KONICK, *Primary Examiner.*

GARY M. HOFFMAN, *Assistant Examiner.*

U.S. Cl. X.R.

340—146.2